United States Patent
Borran et al.

(10) Patent No.: US 7,966,033 B2
(45) Date of Patent: Jun. 21, 2011

(54) SERVING SECTOR DIRECTED POWER CONTROL

(75) Inventors: Mohammad J. Borran, San Diego, CA (US); Aamod Khandekar, San Diego, CA (US); Avneesh Agrawal, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 738 days.

(21) Appl. No.: 11/620,033

(22) Filed: Jan. 4, 2007

(65) Prior Publication Data

US 2007/0197254 A1      Aug. 23, 2007

Related U.S. Application Data

(60) Provisional application No. 60/756,960, filed on Jan. 5, 2006.

(51) Int. Cl.
    *H04B 7/00* (2006.01)
(52) U.S. Cl. .................. 455/522; 455/69; 370/318
(58) Field of Classification Search .............. 455/69, 455/522; 370/318
    See application file for complete search history.

(56) References Cited

U.S. PATENT DOCUMENTS

| | | | |
|---|---|---|---|
| 6,434,130 B1 * | 8/2002 | Soininen et al. | 370/331 |
| 7,046,966 B2 * | 5/2006 | Davis | 455/69 |
| 7,376,436 B2 * | 5/2008 | Hiramatsu | 455/522 |
| 7,580,723 B2 * | 8/2009 | Schwent et al. | 455/522 |
| 2003/0078010 A1 | 4/2003 | Davis | |
| 2003/0134655 A1 | 7/2003 | Chen et al. | |
| 2004/0077370 A1 | 4/2004 | Dick et al. | |
| 2004/0240416 A1 * | 12/2004 | Derryberry et al. | 370/335 |
| 2004/0259559 A1 * | 12/2004 | Li et al. | 455/452.1 |
| 2006/0040619 A1 * | 2/2006 | Cho et al. | 455/69 |
| 2006/0252447 A1 * | 11/2006 | Muharemovic et al. | 455/522 |

FOREIGN PATENT DOCUMENTS

| | | |
|---|---|---|
| EP | 0682418 | 11/1995 |
| RU | 2216106 C2 | 11/2003 |

OTHER PUBLICATIONS

International Search Report-PCT/US2007/060192, International Searching Authority-European Patent Office-Jan. 24, 2008.
Written Opinion-PCT/US2007/060192, International Searching Authority-European Patent Office-Jan. 24, 2008.
International Preliminary Report on Patentability-PCT/US2007/060192, International Bureau of WIPO-Geneva, Switzerland-Jul. 8, 2008.
Taiwanese Search Report—096100617—TIPO—Jun. 1, 2010.

* cited by examiner

*Primary Examiner* — Raymond S Dean
(74) *Attorney, Agent, or Firm* — Milan I. Patel; Howard H. Seo

(57) ABSTRACT

Systems and methodologies are described that facilitate serving sector directed transmit power control in a wireless communication environment. Under certain conditions, an access point can have better data with which to determine appropriate power levels than an individual terminal. Accordingly, an access point can transmit power control information to one or more terminals supported by the access point overriding normal power determination procedures. In particular, power control information can be included within an assignment message that designates resources (e.g., frequency, time) assigned to a terminal. Power control information can be based upon SNR, quality of service requirements, interference information, any other relevant information or any combination thereof.

46 Claims, 11 Drawing Sheets

SERVING SECTOR DIRECTED POWER CONTROL

CROSS-REFERENCE

This application claims the benefit of U.S. Provisional Application Ser. No. 60/756,960 entitled "METHOD OF SERVING SECTOR DIRECTED POWER CONTROL," filed on Jan. 5, 2006. The entirety of the above-referenced application is incorporated herein by reference.

BACKGROUND

I. Field

The following description relates generally to wireless communications, and, amongst other things, to control of transmit power.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Typically, each access point supports terminals located within a specific coverage area referred to as a sector. A sector that supports a specific terminal is referred to as the serving sector. Other sectors, not supporting the specific terminal, are referred to as non-serving sectors. Terminals within a sector can be allocated specific resources to allow simultaneous support of multiple terminals. However, transmissions by terminals in neighboring sectors are not coordinated. Consequently, transmissions by terminals at sector edges can cause interference and degradation of terminal performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with control of transmission power of terminals in a wireless system. In particular, an access point can direct or override transmit power for terminals served by the access point. According to one aspect, an access point can generate and transmit power control information to a terminal located within a sector supported by the access point. In aspects, the access point can provide power control information within a resource assignment message. The terminal can utilize power control information to determine the appropriate transmit power to mitigate interference.

In an aspect, a method for facilitating serving sector control of transmission power for a wireless communication environment can comprise analyzing power related data associated with a terminal supported by a serving sector and transmitting power control information that is based at least in part upon the analysis to the terminal supported by the serving sector. Transmission power of the terminal is a function of the power control information and the power control information can override terminal-based transmission power computation. In addition, the power control information is transmitted to the terminal in a block resource assignment block.

According to another aspect, a method for facilitating control of transmission power of a terminal for a wireless communication environment can comprise receiving power control information from a serving sector of a terminal and determining transmit power for the terminal based at least in part upon the power control information. The power control information can override terminal-based transmit power computation. In addition, the method can include analyzing the power control information to determine a power parameter, the power parameter describes a limit for the transmit power.

According to yet another aspect, an apparatus that facilitates controlling transmit power of terminals supported by an access point can comprise a processor that executes instructions for sending a power control direction to a terminal supported by an access point, where transmit power of the terminal is controlled based at least in part upon the power control direction. The power control direction can supersede terminal-based transmit power computation. The apparatus can also comprise a memory that stores power related information, where the power control direction is based least in part upon the power related information. In addition, the power control direction can be included within a resource assignment message.

According to another aspect, an apparatus that controls terminal transmit power can comprise a memory that stores information associated with transmit power of a terminal and a processor that executes instructions for determining the transmit power based at least in part upon power control information received from an access point that supports the terminal. The power control information can override terminal-based transmit power computation. In addition, the processor further executes instructions for adjusting the transmit power as a function of other sector interference information.

According to another aspect, an apparatus facilitates control of transmit power for a wireless communication environment can comprise means for evaluating power related data for a serving sector, means for generating power control information for a terminal based at least in part upon the evaluation, and means for providing the power control information to the terminal. The power control information directs transmit power for the terminal and power control information can override terminal transmit power calculation. The apparatus can also include means for obtaining interference information for a non-serving sector, where the power related data includes the interference information.

According to another aspect, an apparatus that facilitates determining transmit power for a terminal for a wireless communication environment can comprise means for means for obtaining power control information from a serving sector supporting a terminal and means for setting transmit power level of the terminal as a function of the power control information, where the power control information can override terminal-based transmit power level calculation. The apparatus can also include means for determining when the power control information specifies independent determination of the transmit power level and means for setting the transmit power level as a function of other sector interference information.

Yet another aspect relates to a computer-readable medium having instructions for generating power control information as a function of data associated with a terminal supported by an access point and transmitting the power control information to the terminal. The power control information directs transmit power for the terminal and the power control information can override terminal-based transmit power computation. In addition, instructions can include identifying conditions that warrant override of independent power computation by the terminal.

Another aspect relates to a computer-readable medium having instructions for obtaining a power instruction from an access point supporting a terminal and controlling transmit power for the terminal based at least in part upon the power control instruction. The power instruction can override terminal-based transmit power calculation. In addition, the power control instruction includes a duration parameter that specifies duration of the power control instruction.

Yet another aspect relates to a processor that executes instructions for evaluating data related to a terminal supported by a serving sector and provisioning the terminal with power control information that overrides terminal power estimation of transmit power for the terminal. Additionally, the power control information includes a limit for the transmit power.

Yet another aspect relates to a processor that executes instructions for receiving power control information for a terminal from a serving sector that supports the terminal and computing transmit power based at least in part upon the received power control information. The power control information overrides the terminal-based transmit power computation. In addition, the instructions can comprise analyzing the power control information to determine when the independent determination of transmit power is specified.

To the accomplishment of the foregoing and related ends, the one or more aspects comprise the features hereinafter fully described and particularly pointed out in the claims. The following description and the annexed drawings set forth in detail certain illustrative aspects. These aspects are indicative, however, of but a few of the various ways in which the principles described herein may be employed and the described are intended to include their equivalents.

DETAILED DESCRIPTION

Figure 1:
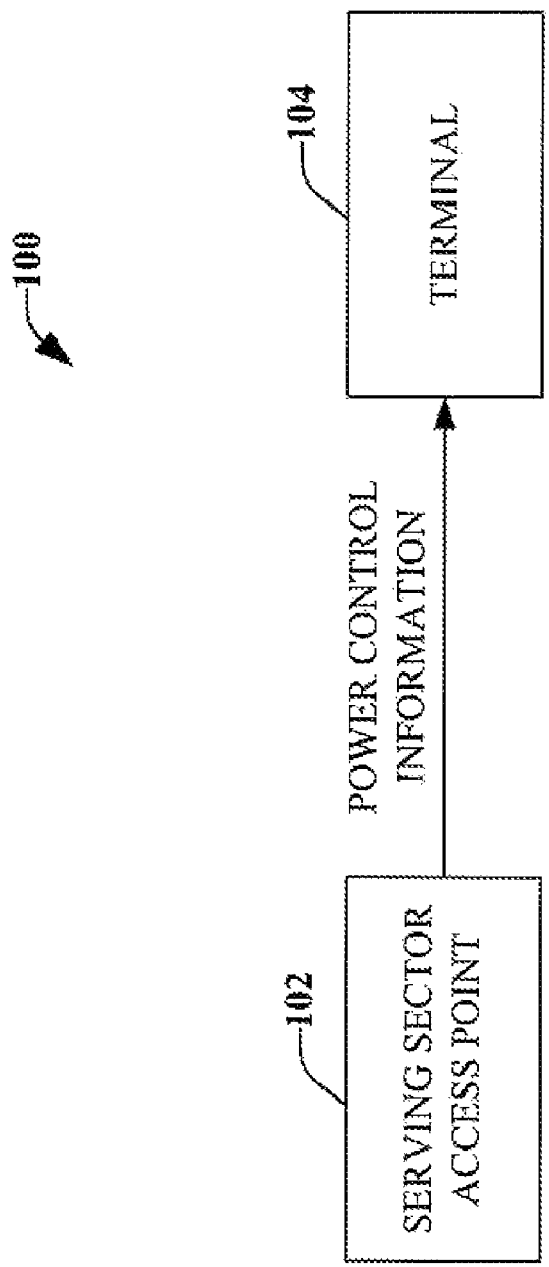
FIG. 1 is a block diagram of a system that facilitates control of transmission power in accordance with one or more aspects presented herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a terminal. A terminal can also be called a system, a user device, a subscriber unit, subscriber station, mobile station, mobile device, remote station, access point, base station, remote terminal, access terminal, user terminal, terminal, user agent, or user equipment (UE). A terminal can be a cellular telephone, a cordless telephone, a Session Initiation Protocol (SIP) phone, a wireless local loop (WLL)

station, a PDA, a handheld device having a wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Typically, terminals regulate their transmission power to minimize or mitigate interference for neighboring, non-serving sectors. Terminals can include power control algorithms that allow a terminal to transmit at as high a power level as possible while keeping inter-sector interference within acceptable levels. Generally, access points monitor interference within a sector and broadcast interference information, such as Other Sector Interferences (OSI), for use by terminals in neighboring sectors. Terminals can adjust transmission power based upon interference in non-serving sectors proximate to the terminal. Each terminal can set transmission power based upon interference information received from neighboring sectors, previous transmission power levels and/or a measure of channel strengths between the terminal and the non-serving sectors. In cases where signal distortions caused by physical channel result in loss of orthogonality and therefore intra-sector interference, the terminal can also take into account the requirements on the dynamic range of the received signal when adjusting power control.

The serving sector of a terminal can be in the best position to determine transmit power for the terminal. Non-serving sectors are concerned only with minimizing interference and terminals can lack relevant information. A serving sector can have better information than non-serving sectors regarding the required transmit power level of the terminal for specific transmissions. In particular, the serving sector can have a more accurate estimate of the terminal's reverse link channel quality than non-serving sectors. In addition, the serving sector can have information regarding specific quality of service requirements for a particular packet. For example, the serving sector can determine that, based upon available resources for the terminal, the current power level of the terminal is insufficient for the quality of service requirement for a given packet. The serving sector can also determine that, even with the minimum assignment, the terminal's current power level is higher than the power needed to transmit a given packet. In circumstances where the serving sector has such additional information, the serving sector can override typical terminal power analysis and direct transmission power for terminals supported by the serving sector.

With reference now to the drawings, FIG. 1 illustrates a block diagram of a system 100 that provides for serving sector directed power control. System 100 includes at least one access point 102 and at least one terminal 104 supported by a sector of access point 102. The term "sector" can refer to an access point and/or an area covered by an access point, depending upon context. A single serving sector and terminal are illustrate for simplicity. However, system 100 can include multiple serving sector and terminals. Serving sector 102 can explicitly control the power of transmissions via a power control information instruction. For example, the power control information from serving sector 102 can explicitly specify the transmit power level at terminal 104 for a given packet, improving the quality of service for that packet, or resulting in power savings and increased battery life for terminal 104. The power control information can override terminal computation of appropriate transmission power setting. System 100 can be utilized in a variety of multiple access systems, including, but not limited to, a CDMA system, a TDMA system, an FDMA system, an OFDMA system, an interleaved frequency division multiple access (IFDMA) system and a localized frequency division multiple access (LFDMA) system.

There are various scenarios in which serving sector 102 is better able to determine appropriate transmission power for a supported terminal than the terminal itself. Certain types of traffic require a specific quality of service and therefore a specified transmit power. For example, in Voice over Internet Protocol (VOIP) a particular power level may be required to terminate transmission. Base station 102 can direct terminal 104 to utilize the specific power transmission level necessary to terminate transmissions.

Serving sector 102 can also use power control information to direct transmission power for terminals located within areas of high interference. The power level of terminals close to the edge of sectors can be pushed down or decreased over time to minimize interference in other non-serving sectors. In areas of high interference at sector edges, terminals are likely to be receiving information regarding interference from neighboring sectors. Over time the transmission power for such terminals can be decreased, causing reduced performance. In such cases, transmission power level can be rapidly increased based upon power control information provided by serving sector 102. Serving sector 102 can reset the power to the level required to terminate a packet. While resetting the power level may impact interference for other sectors, it may be necessary to ensure performance of the supported terminal.

Serving sector 102 can analyze interference information for non-serving sectors when generating a power control information. Typically, serving sector 102 utilizes Other Sector Interference (OSI) information broadcast by non-serving sectors to compute power control instructions. Serving sector 102 can obtain information regarding other sector interference through backhaul signaling. As used herein, backhaul signaling refers to communication among sectors or access points. Serving sector 102 may consider interference information such as OSI during computation of appropriate power levels for terminals within serving sector 102 and generation of the power control information.

Serving sector 102 may have access to additional data relevant to setting appropriate transmission power. For example, serving sector 102 can have information regarding forward link geometry as well as differences in channel strengths between the terminal and the serving sector and the terminal and non-serving sectors, possibly at a slow time scale. In such cases, serving sector 102 can be better situated to determine transmit power than the terminal 104.

Serving sectors 102 can also adjust transmission power more rapidly than terminals 104. In general, terminals 104 monitor OSI information and incrementally adjust transmission power over time. However, in a partially loaded system, if a terminal is inactive and has not transmitted or adjusted its power for a period of time, the terminal can utilize an excessive transmit power level and may take several iterations to adjust transmit power to the appropriate level. During this adjustment period, the terminal transmission can cause significant interference for neighboring sectors. However, if transmit power is directed by the serving sector, the serving sector or access point can send an explicit power level command to the terminal, preventing it from transmitting at its maximum power and reducing interference to neighboring sectors.

The base station can provide a default value within a power control information transmission to allow terminals to compute transmission power without regard to power control information. When the power control information does not include the default, the terminal can utilize the provided information to determine transmit power and override the terminal's estimate of required power. The terminal's estimate can also be used in combination with the power control information. For example, the power control information can include a range of power levels or a minimum required power level. The terminal can compute transmission power within the range or in excess of the minimum value based upon the terminal's own estimate of required power.

Figure 2:
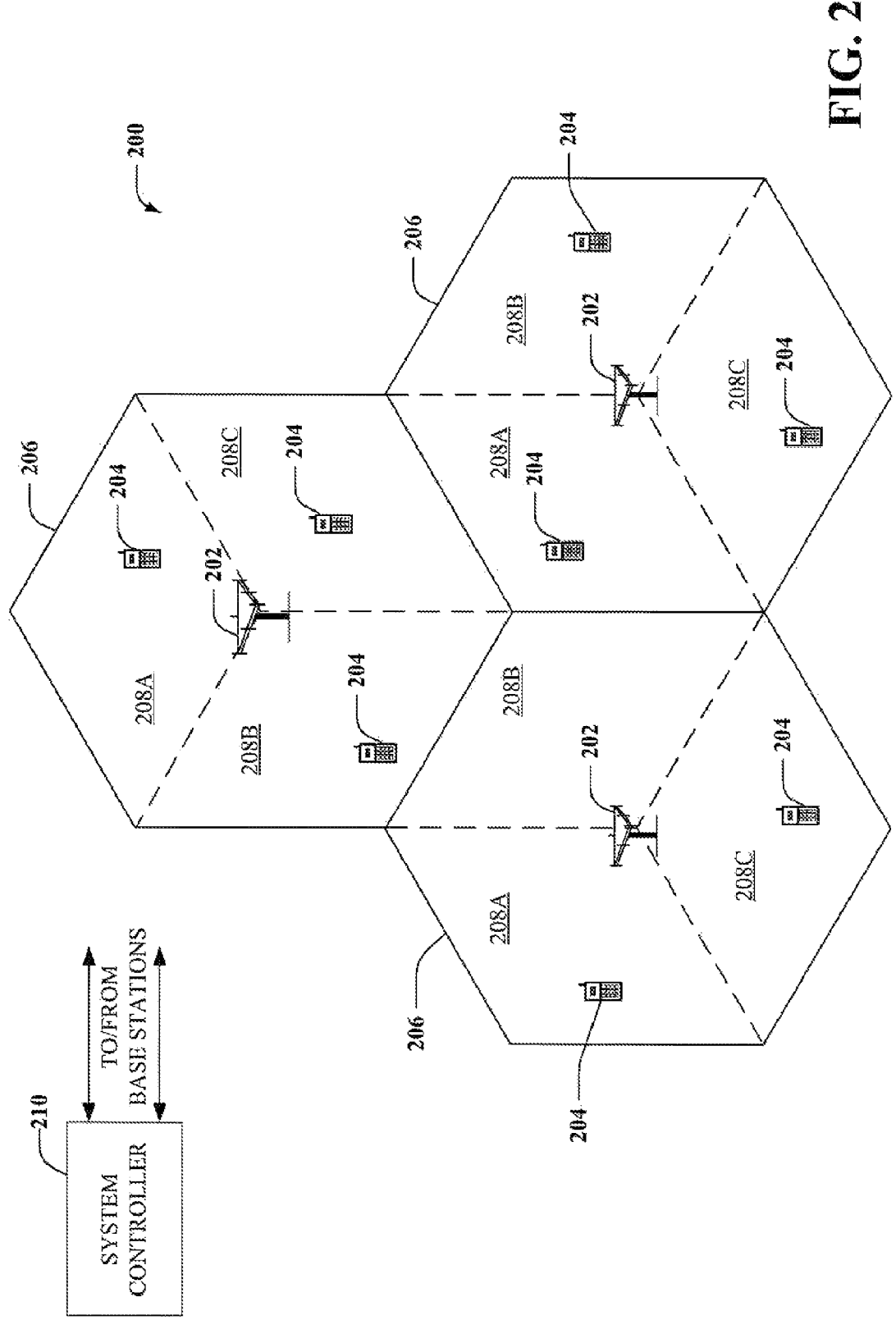
FIG. 2 is an illustration of a wireless communication system in accordance with one or more aspects presented herein.

Referring now to FIG. 2, a wireless communication system 200 in accordance with various aspects presented herein is illustrated. System 200 can comprise one or more access points 202 that receive, transmit, repeat, etc., wireless communication signals to each other and/or to one or more terminals 204. Each base station 202 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 204 can be, for example, cellular phones, smart phones, laptops, handheld communication devices, handheld computing devices, satellite radios, global positioning systems, PDAs, and/or any other suitable device for communicating over wireless system 200. In addition, each terminal 204 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 2, each access point provides communication coverage for a particular geographic area 206. The term "cell" can refer to an access point and/or its coverage area, depending on content. To improve system capacity, an access point coverage area can be partitioned into multiple smaller areas (e.g., three smaller areas 208A, 208B and 208C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 204 are typically dispersed throughout system 200. Each terminal 204 may be fixed or mobile. Each terminal 204 may communicate with one or more access points 202 on the forward and reverse links at any given moment.

For a centralized architecture, a system controller 210 couples access points 202 and provides coordination and control of access points 202. For a distributed architecture, access points 202 may communicate with one another as needed. Communication between access points via system controller 210 or the like can be referred to as backhaul signaling.

The techniques described herein may be used for a system 200 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 3:
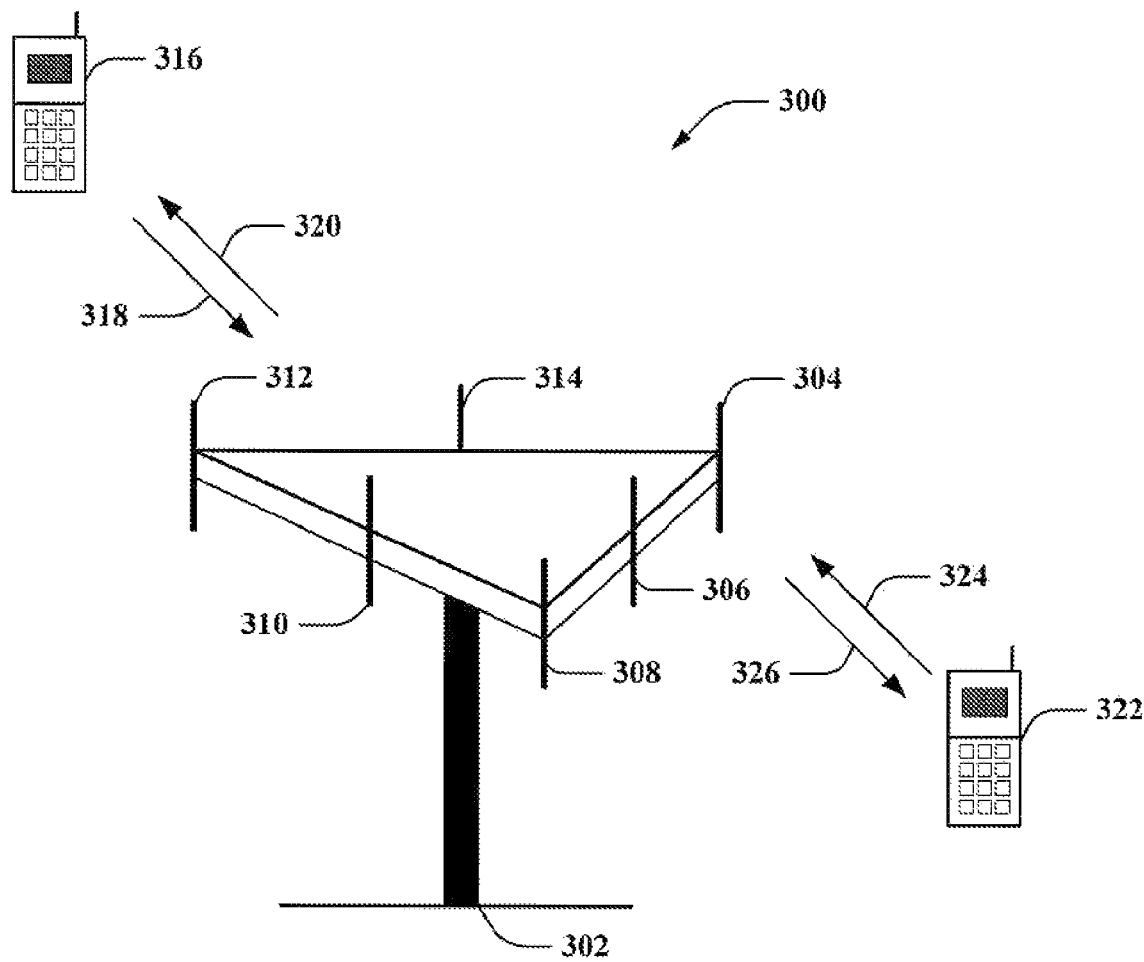
FIG. 3 is an illustration of a wireless communication system in accordance with one or more aspects presented herein.

Referring now to FIG. 3, a multiple access wireless communication system 300 according to one or more aspects is illustrated. A 3-sector access point 302 includes multiple antenna groups, one including antennas 304 and 306, another including antennas 308 and 310, and a third including antennas 312 and 314. According to the figure, only two antennas are shown for each antenna group, however, more or fewer antennas may be utilized for each antenna group. Terminal 316 is in communication with antennas 312 and 314, where antennas 312 and 314 transmit information to terminal 316 over forward link 320 and receive information from terminal 316 over reverse link 318. Terminal 322 is in communication with antennas 304 and 306, where antennas 304 and 306 transmit information to terminal 322 over forward link 326 and receive information from terminal 322 over reverse link 324.

Each group of antennas and/or the area in which they are designated to communicate may be referred to as a sector of access point 302. In one or more aspects, antenna groups each are designed to communicate to terminals in a sector or the areas covered by access point 302. Each access point can provide coverage for a plurality of sectors.

Wireless communication systems can include one or more access points 302 in contact with one or more terminals 316, 322. The coverage areas of the access points can overlap. Consequently, terminals can be located within the coverage area of multiple access points.

Typically, when a terminal is within the coverage area provided by multiple access points, an access point and serving sector is selected based upon the signal strength of the pilot or signal transmission from the access point to the terminal. The signal strength can be measured in terms of the radio frequency (RF) path loss, where the path loss is the power loss that occurs when the radio waves move through space along a specific path. In order to determine the path loss, all access points within the network can transmit signals at a predetermined power. The terminal can then measure the power of each of the received signals to determine the access point with the strongest signal strength. Alternatively, the signals can be transmitted at an undetermined power and the transmit power can be encoded in the signal or in another channel. The terminal can then compare the difference between the transmitted and received powers to determine the access point with the strongest signal strength.

Referring to FIGS. 4-7, methodologies for control of transmission power levels are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

Figure 4:
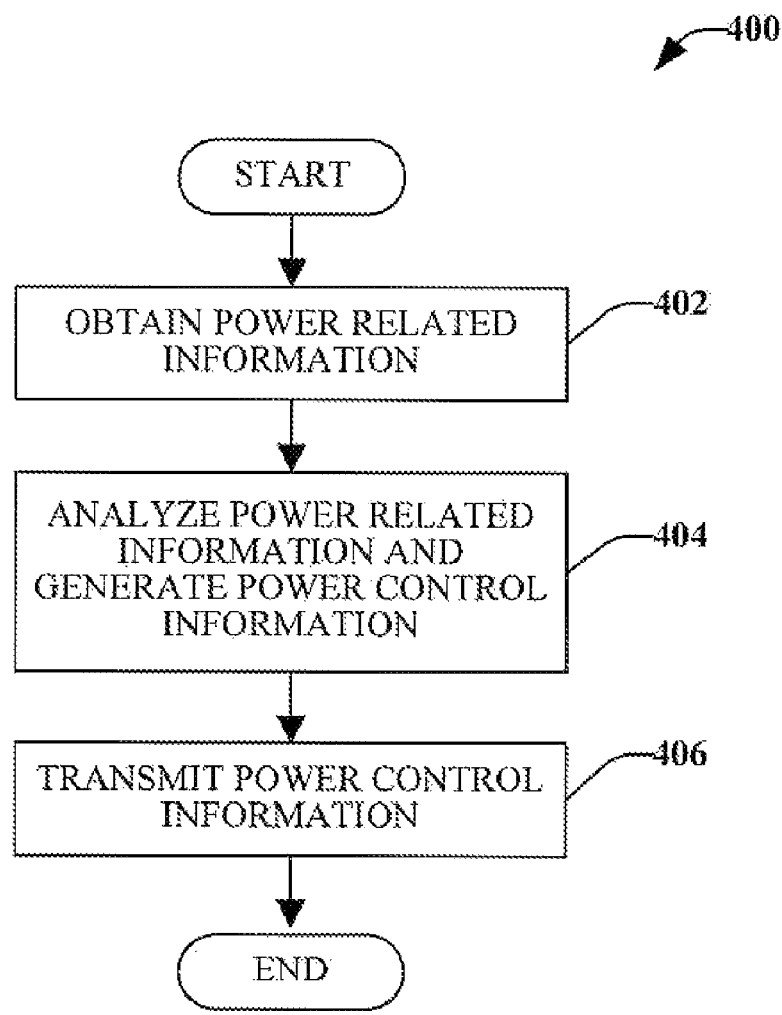
FIG. 4 illustrates a methodology for controlling transmission power for a terminal in accordance with one or more aspects presented herein.

Referring now to FIG. 4, a methodology 400 for controlling transmission power for a terminal is illustrated. At reference numeral 402, power related information can be obtained.

Power related information can include any data suitable or relevant to determining appropriate transmission power level for a terminal. Such information can include current transmission power of the terminal, interference data relevant to the terminal (e.g., OSI), quality of service requirements, channel strengths between a terminal and the serving sector and non-serving sectors, as well as any other information relevant in determining appropriate transmission power for one or more terminals.

Power related information can also include received signal quality. The received signal (e.g., the received signal-to-noise ratio (SNR)) can be estimated for each terminal that is supported. Power control information for each terminal can be generated such that the received signal quality for the terminal is maintained within an acceptable range.

The power related information can be analyzed at reference numeral 404 to determine the power level or range of power levels for a terminal or terminals and generate power control information. The analysis can be a function of power requirements for certain packets, interference, SNR, terminal battery life maximization, any combination thereof and any other relevant information. The generated power control information can be in any format suitable for use by a terminal. Power control information can specify a specific power level, a range or limit for permissible power level. In addition, the power control information can include a duration parameter that specifies a period of time or number of packets over which the provided power level limitations are to be applied.

Power control information can be transmitted to a terminal at reference numeral 406. In particular, power control information can be provided within the assignment block transmitted to a terminal. Generally, an assignment block provides a terminal with instructions regarding the resources (e.g., frequency, time, and/or code) allocated to the terminal as well as any coding and modulation to be used for transmission. A field or fields can be provided with a Reverse Link Assignment Block (RLAB) that includes power control information (e.g., a power level, range of power levels, a default value, and/or a time period or numbers of packets over which the power control information is applied). Power levels can be specified as a fixed level or a delta or change from a previous level can be indicated. The power control field can provide traffic channel power spectral density with respect to the reference control channel power spectral density. The power field can be set to a default value to direct the terminal to follow normal power control procedures when there is no need for power assignment from the serving sector.

In another aspect, a serving sector can broadcast power control information to the set of terminals within the serving sector or any subset of such terminals. In such cases, the serving sector can control power for multiple terminals using a single broadcast transmission.

Figure 5:
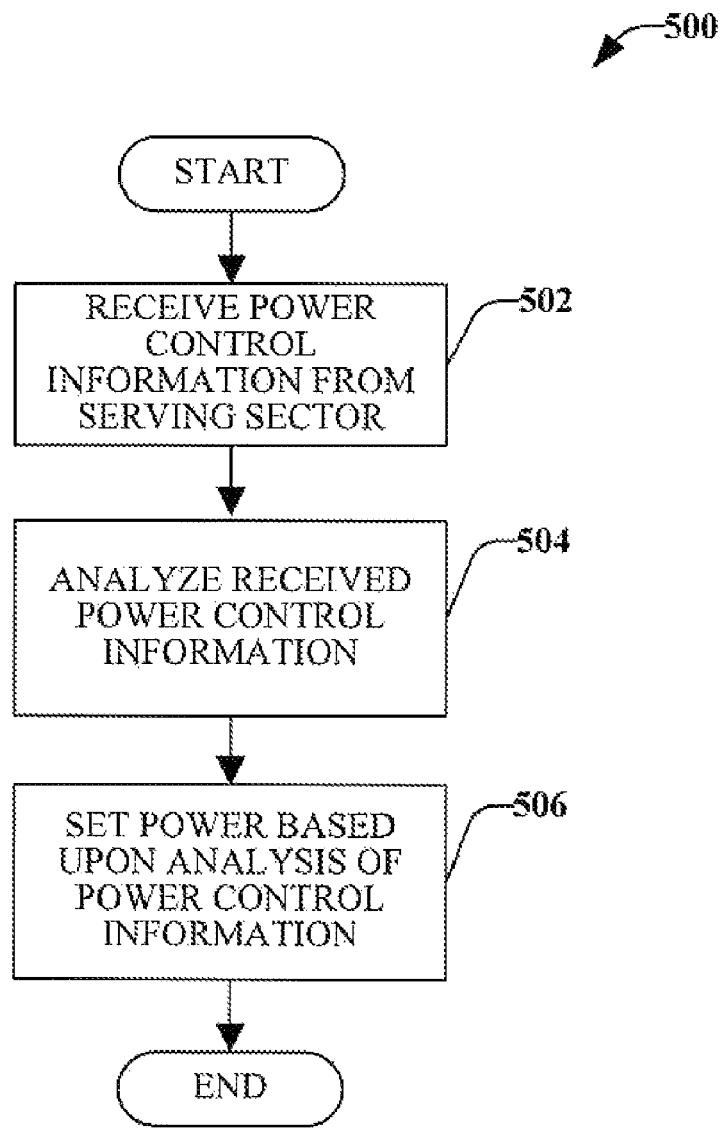
FIG. 5 illustrates a methodology for determining transmission power for a terminal in accordance with one or more aspects presented herein.

Turning now to FIG. 5, a methodology 500 for determining transmission power for a terminal is illustrated. At reference numeral 502, power control information is received from a serving sector. The power control information can be included in the assignment block message, broadcast to multiple terminals or transmitted in any other suitable manner. The power control information can specify a range or set of possible power levels (e.g., minimum and maximum power levels). The power control information can specify power levels using fixed, independent values or by specifying a delta or change from a previous power level.

The power control information can also specify a time period or number of packets during which the transmission power level for the terminal is directed is to be controlled based upon the power control information. Alternatively, the serving sector power control information can override any terminal generated power requirement estimates until the terminal receives a signal indicating a return to terminal directed power. For instance, presence of a default value within the power control information could signal a return to terminal directed transmit power. Once control of transmit power is returned to the terminal, the terminal can adjust power settings or return to power settings previous to control by the serving sector.

The power control information can be analyzed to determine the appropriate power level at reference numeral 504. When the explicit power level information is present in the power control information, the explicit power level information can override the current transmit power setting of the terminal. The terminal can continue to use the specified power setting. Alternatively, the terminal can continue in its normal power adjustment procedures, unless or until the terminal receives new power control information for the subsequent packets. For example, the terminal can adjust transmit power levels based upon interference level indications (e.g., OSI) from non-serving sectors for subsequent packets. Alternatively, the terminal can utilize the power control information without adjustment until directed to resume normal power adjustment procedures.

At reference numeral 506, the transmit power level for the terminal can be set based at least in part upon analysis of the power control information. In aspects, power control information can be combined with other information for selection of appropriate power level. For example, transmit power level can be limited based upon terminal power capabilities and/or remaining battery power. In addition, transmit power level can be a function of interference information received from non-serving sectors.

Figure 6:
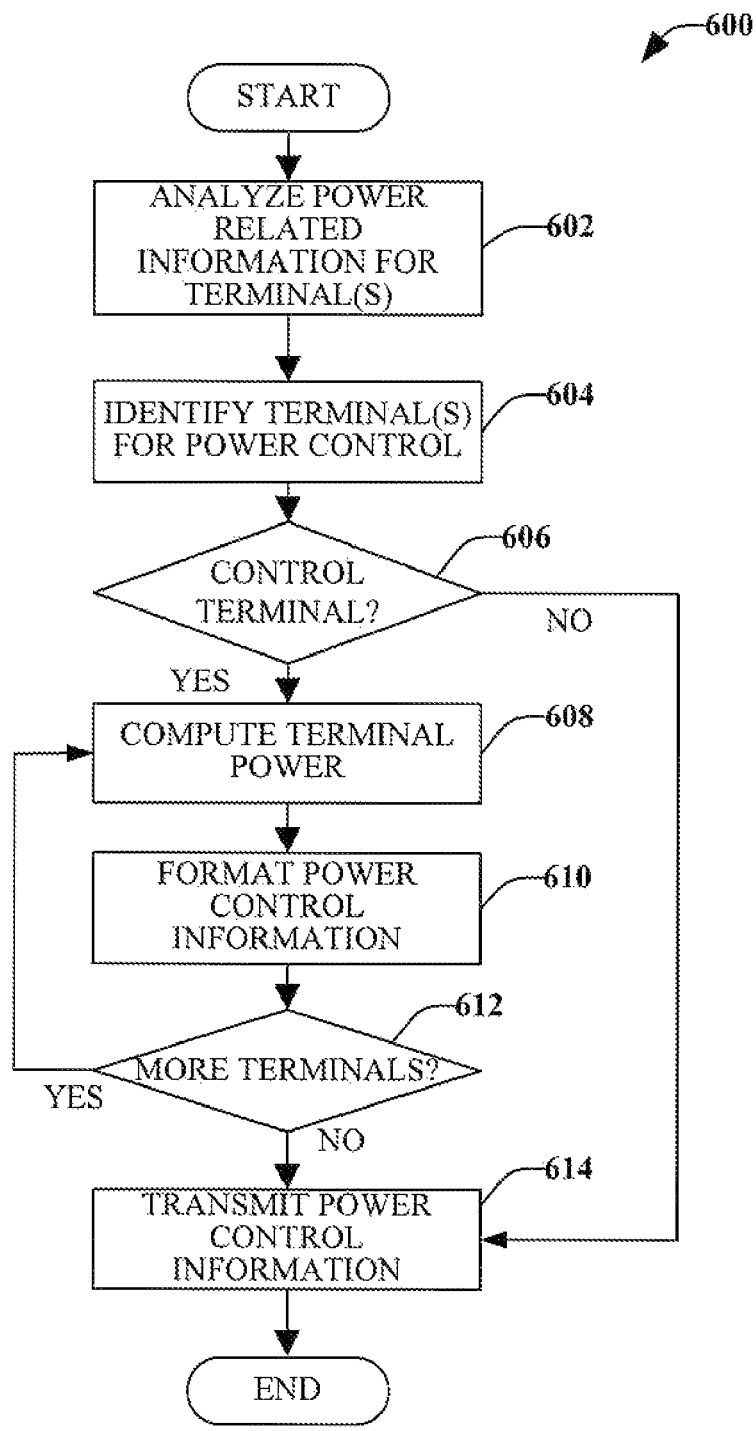
FIG. 6 illustrates a methodology for controlling transmission power for a terminal in accordance with one or more aspects presented herein.

Referring now to FIG. 6, a more detailed methodology 600 for controlling terminal transmission power is illustrated. At reference number 602, power related information associated with terminals supported by a serving sector can be analyzed. Information can include interference information, quality of service requirements, channel strength, previous transmit power levels of terminals or any other information material to determining an appropriate power level for terminal(s). In particular, interference information can include OSI provided by other non-serving sectors. Such information can be exchanged via backhaul signaling. The serving sector can also trade off the available power (or interference caused at other sectors) between different terminals on a packet by packet basis.

At reference numeral 604, terminals whose power levels are to be controlled by the serving sector can be identified. In particular, terminals where the service sector can determine the appropriate power level for the terminal more accurately than the individual terminal can be singled out. Terminals can be identified based upon analysis of power related information associated with terminals. Certain scenarios problematic for terminal power control can be recognized. For example, as discussed above, terminals located at high interference level areas (e.g., close to the edge of sectors) can be pushed down or decreased over time to minimize interference in other non-serving sectors. Such terminals can be marked for transmit power control.

At reference numeral 606, a determination is made as to whether at least one terminal has been identified for transmit power control. If not, the process continues at reference numeral 614, where power control information can be set to a default value and transmitted to the terminals. The default value can indicate that the terminals are to utilize normal power control procedures. Typically, such terminals determine transmit power based upon OSI from non-serving sectors.

If one or more terminals have been selected for control by the serving sector, the transmit power for a specific terminal is computed at reference terminal 608. Computation can include determining a preferred level or range of levels. Additionally, computation can include determining the length of time or number of packets to be transmitted at the preferred power. At reference numeral 610, the power control information is formatted for transmission to the terminal. For example, the power control information can be expressed as a change or delta to the current power.

At reference numeral 610, a determination is made as to whether there are additional terminals that require serving sector power control. If yes, the process returns to reference numeral 608, where power level is computed for the next terminal. If not, the process continues at reference numeral 614, where the power control information is transmitted to the terminal(s). Power control information can be transmitted individually to terminals. For example, power control information can be included within the assignment message to each terminal within the serving sector.

Serving sector directed transmit power allows the serving sector to control power of each terminal within the sector. The serving sector can change the power on a packet-by-packet basis as a function of latency targets, quality of service requirements, assignment size, number of other uses scheduled and other related parameters. The serving sector can also trade off the available power (or interference caused at other sectors) between different terminals on a packet by packet basis.

In other aspects, a power level or range can be determined for a set of terminals. The set can include all terminals within the serving sector or any subset thereof. The power control information can be broadcast such that it is received by multiple terminals. The broadcast power control information can be used by all terminals that receive the broadcast or a subset thereof.

Figure 7:
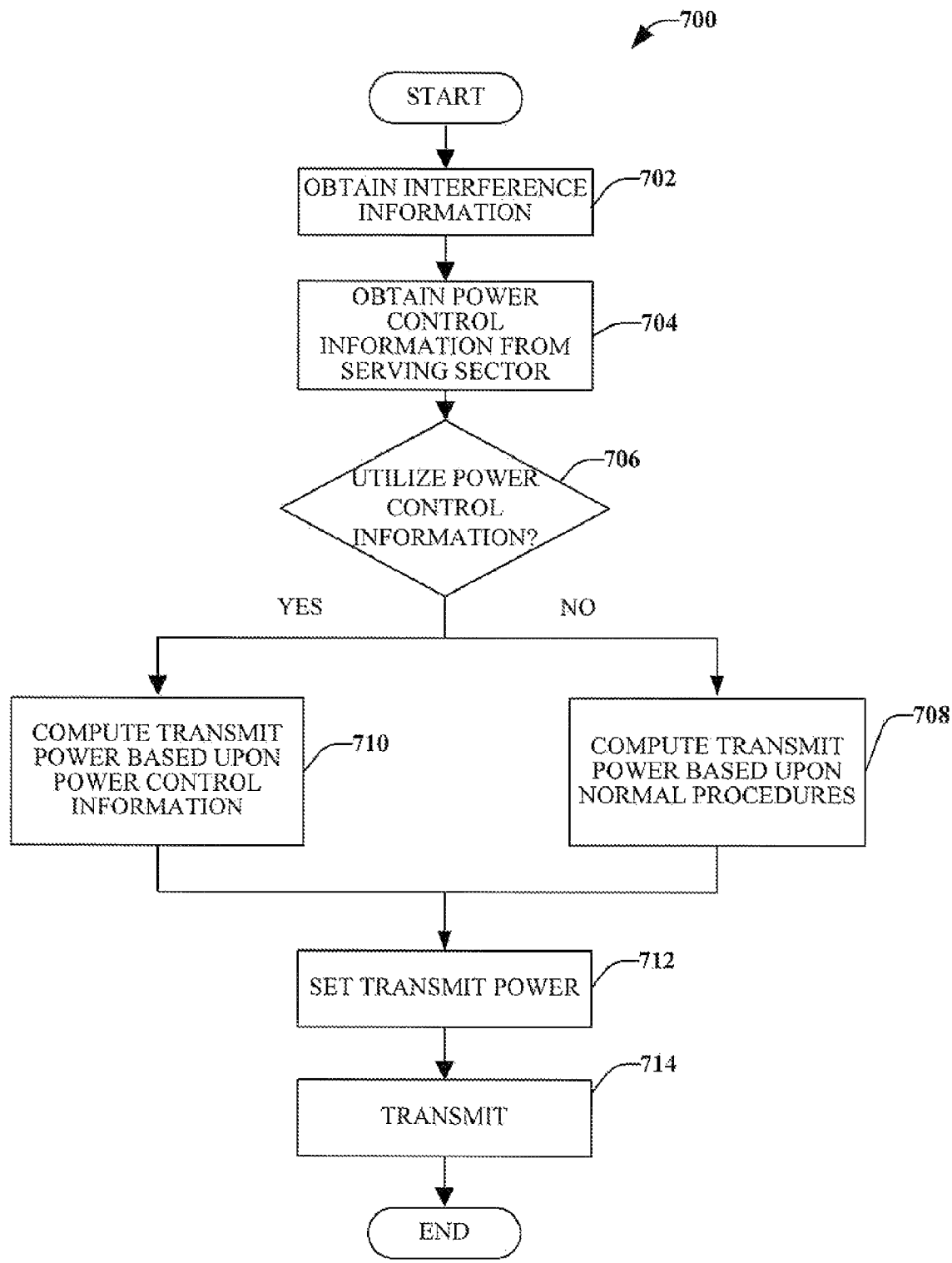
FIG. 7 illustrates a methodology for determining transmission power for a terminal in accordance with one or more aspects presented herein.

Turning now to FIG. 7, a methodology 700 for determining transmission, power for a terminal is illustrated. At reference numeral 702 interference information (e.g., OSI) can be received from one or more neighboring sectors. Power control information can be received from a serving sector at reference numeral 704. The power control information can be received in any transmission, including an assignment block and/or broadcast message. At reference numeral 706, a determination can be made as to whether the power control information is to be utilized in determining transmission power. For instance, the power control information can include a default value indicating that the terminal is to utilize terminal controlled power level procedures and ignore the power control information. If no, at reference numeral 708 the terminal can utilize other power control algorithms, including analysis of OSI, to compute transmission power.

If the power control information is to be utilized, the process continues at reference numeral 710 where the power control information is analyzed and transmit power is computed based at least in part upon the power control information. As discussed above, power control information can specify a particular power level, a range of levels or other limitations and restrictions on transmit power. The transmit power can be set at reference numeral 712 based upon the power computations. At reference numeral 714, the terminal can transmit at the appropriate power level.

Generally, when power control information is provided, the power control information overrides the current transmit power setting of the terminal. In particular, if power control information is provided in an assignment block, the terminal uses the new power setting for the new assignment. The terminal can continue its normal power adjustment procedures based upon interference level indications (e.g., OSI) from non-serving sectors for subsequent packets, unless it receives new assignments with explicit power level information for the subsequent packets.

It will be appreciated that interferences can be made regarding transmission power, formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding power level requirements in determining power control information. Inferences can also be made regarding battery life, channel strength, interference and the like.

Figure 8:
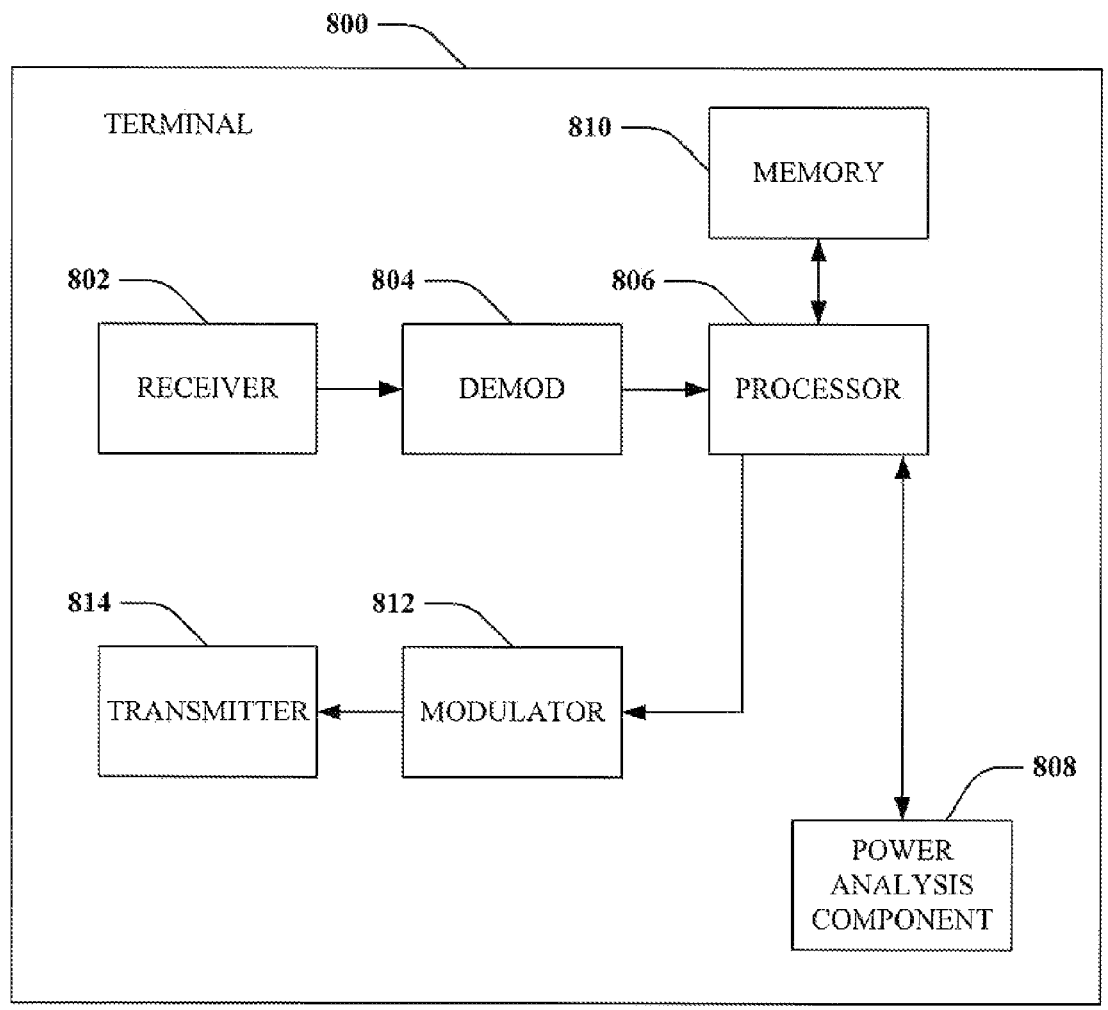
FIG. 8 illustrates a system that utilizes power control information to set transmit power for a terminal in accordance with one or more aspects presented herein.

FIG. 8 is an illustration of a terminal or terminal 800 that provides for directed transmission power in a wireless communication environment in accordance with one or more aspects set forth herein. Terminal 800 comprises a receiver 802 that receives a signal, for instance one or more receive antennas, and performs typical actions (e.g., filters, amplifiers, downconverts, etc.) the received signal and digitizes the conditioned signal to obtain samples. A demodulator 804 can demodulate the samples and provide received pilot symbols to a processor 806.

Processor 806 can be a processor dedicated to analyzing information received by receiver component 802 and/or generating information for transmission by a transmitter 814. Processor 806 can be a processor that controls one or more components of terminal 800, and/or a processor that analyzes information received by receiver 802, generates information for transmission by a transmitter 814, and controls one or more components of terminal 800. Processor 806 can utilize any of the methodologies described herein, including those described with respect to FIGS. 4-7, to determine transmission power.

In addition, terminal 800 can include a power analysis component 808 that analyzes received input, including power control information obtained from a serving sector and determines transmission power. Power analysis component 808 can also utilize information received from non-serving sectors (e.g., OSI), as well as other power related information such as previous transmit power levels, device information (e.g., battery power) and the like. Power analysis component 808 can be incorporated into the processor 806. It is to be appreciated that power analysis component 808 can include power analysis code that performs utility based analysis in connection with determining transmission power. The power analysis code can utilize artificial intelligence based methods in connection with performing inference and/or probabilistic determinations and/or statistical-based determinations in connection with optimizing transmission power.

Terminal 800 can additionally comprise memory 810 that is operatively coupled to processor 806 and that can store information related to transmission power, interference information (e.g., OSI), methods for determining transmission power, lookup tables comprising information related thereto, and any other suitable information related to transmission power as described hereto. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory. Processor 806 is connected to a symbol modulator 812 and transmitter 814 that transmits the modulated signal.

Figure 9:
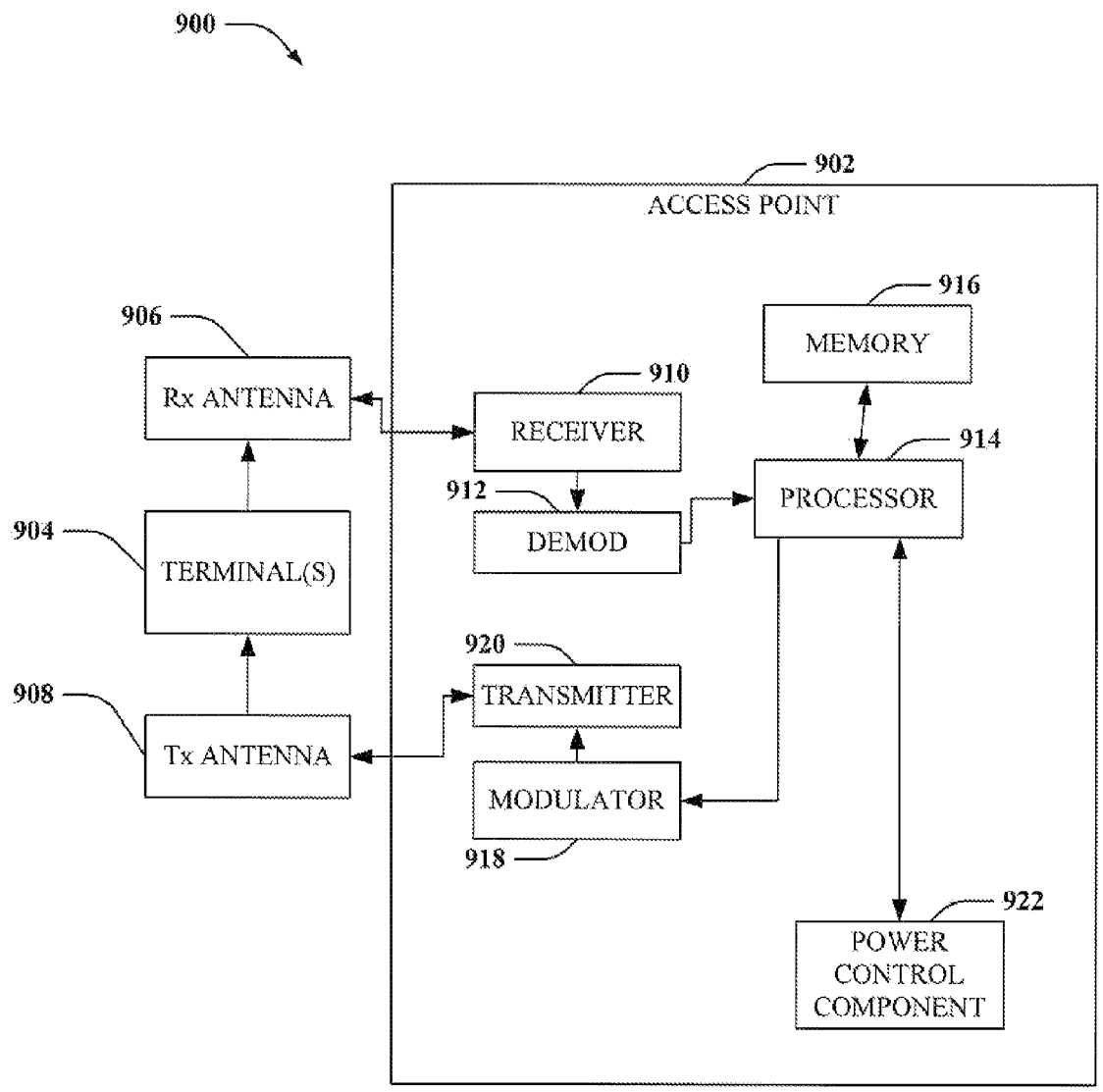
FIG. 9 illustrates a system that generates power control information for a terminal in accordance with one or more aspects presented herein.

FIG. 9 is an illustration of a system 900 that facilitates transmission power control in a communication environment in accordance with various aspects. System 900 comprises an access point 902 with a receiver 910 that receives signal(s) from one or more terminals 904 through one or more receive antennas 906, and transmits to the one or more terminals 904 through a plurality of transmit antennas 908. In one or more aspects, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 914 that is similar to the processor described above with regard to FIG. 8, and is coupled to a memory 916 that stores information related to interference, transmission power levels, and the like. Receiver output for each antenna can be jointly processed by receiver 910 and/or processor 914. A modulator 918 can multiplex the signal for transmission by a transmitter 920 through transmit antennas 908 to terminals 904.

Access point 902 further comprises a power control component 922, which can be a processor distinct from, or integral to, processor 914. Power control component 922 can evaluate power related information and generate power control information for one or more terminals 904. Power related information can include interference information (e.g., OSI), previous terminal transmit power levels, quality of service requirements, channel strengths and the like. The power control component 922 can modify power on a packet-by-packet basis and trade off available power between different terminals. It is to be appreciated that power control component 922 can include power analysis code that performs utility based control in connection with determining power control information. The power control code can utilize artificial intelligence based methods in connection with performing inference and/or probabilistic determinations and/or statistical-based determinations in connection with optimizing transmission power.

Figure 10:
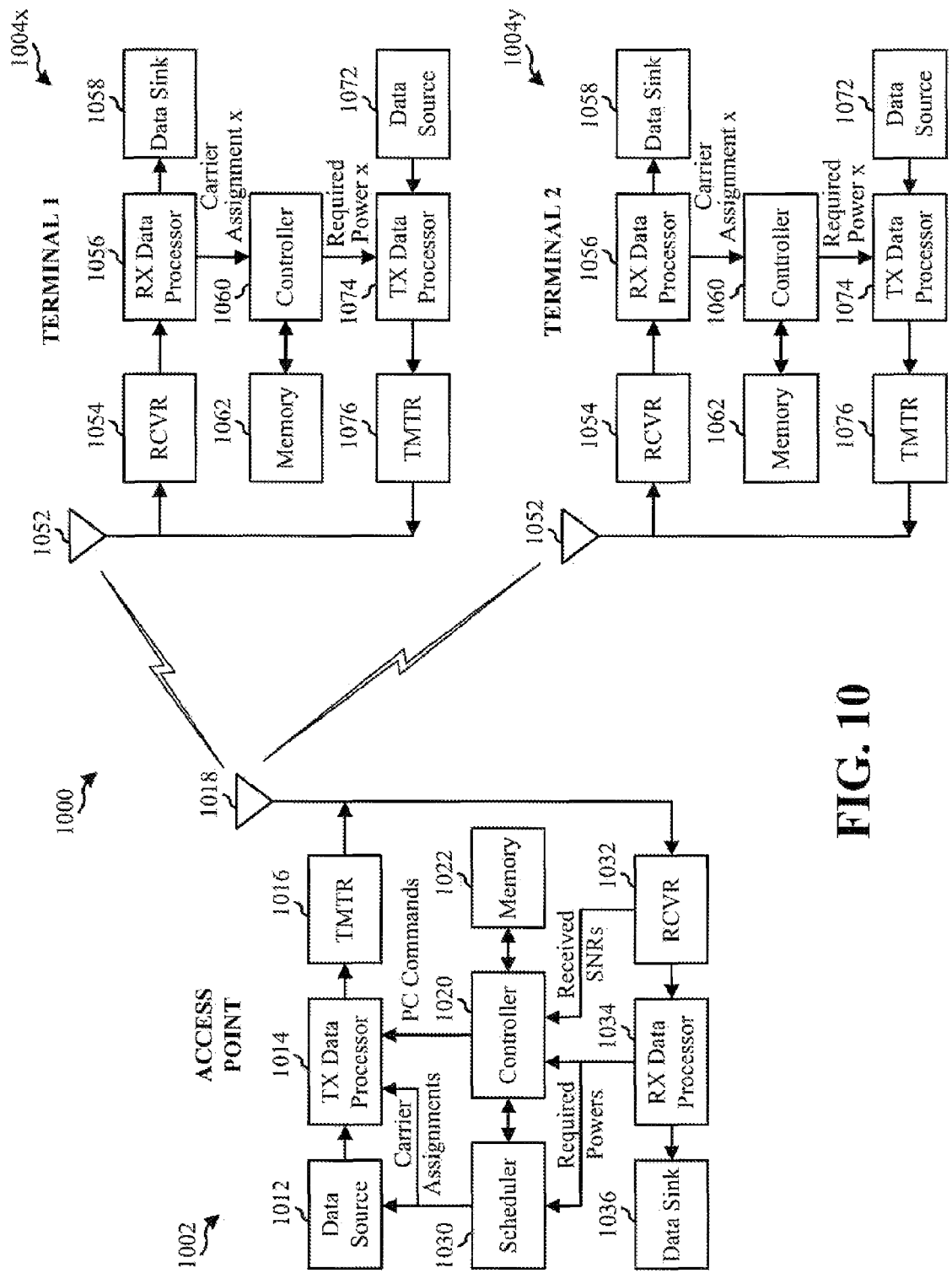
FIG. 10 is an illustration of a wireless communication environment that can be employed in conjunction with the various systems and methods described herein.

FIG. 10 shows an exemplary wireless communication system 1000. The wireless communication system 1000 depicts one access point and two access points for sake of brevity. However, it is to be appreciated that the system can include more than one access point and/or one or more terminals, wherein additional access points and/or terminals can be substantially similar or different from the exemplary access point and terminals described below. In addition, it is to be appreciated that the access point and/or the terminals can employ the systems (FIGS. 1-3, 8 and 9) and/or methods (FIGS. 4-7) described herein.

FIG. 10 shows a block diagram of an access point 1002 and two terminals 1004x and 1004y in multiple-access multi-carrier communication system 1000. At access point 1002, a transmit (TX) data processor 1014 receives traffic data (i.e., information bits) from a data source 1012 and signaling and other information from a controller 1020 and a scheduler 1030. For example, controller 1020 may provide power control information used to adjust the transmit power of the supported, active terminals, and scheduler 1030 may provide assignments of carriers for the terminals. Additionally, a memory 1022 can maintain information regarding current or previous assignments and/or power levels. The various types of data (e.g., power control information and assignment information) may be sent on different transport channels, TX data processor 1014 encodes and modulates the received data using multi-carrier modulation (e.g., OFDM) to provide modulated data (e.g., OFDM symbols). A transmitter unit (TMTR) 1016 then processes the modulated data to generate a downlink modulated signal that is then transmitted from an antenna 1018.

At each of terminals 1004x and 1004y, the transmitted and modulated signal is received by an antenna 1052 and provided to a receiver unit (RCVR) 1054. Receiver unit 1054 processes and digitizes the received signal to provide samples. A received (RX) data processor 1056 then demodulates and decodes the samples to provide decoded data, which may include recovered traffic data, messages, signaling, and so on. The traffic data may be provided to a data sink 1058, and the carrier assignment and power control information sent for the terminal is provided to a controller 1060.

Controller 1060 directs data transmission on the uplink using the specific carriers that have been assigned to the terminal and indicated in the received carrier assignment. Controller 1060 further adjusts the transmit power used for the uplink transmissions based on the received power control information. A memory 1062 can maintain information regarding previous power control information, previous other sector interference (OSI) information and/or other transmit power related information.

For each active terminal 1004x and 1004y, a TX data processor 1074 receives traffic data from a data source 1072 and signaling and other information from controller 1060. For example, controller 1060 may provide information indicative of the required transmit power, the maximum transmit power, or the difference between the maximum and required transmit powers for the terminal. The various types of data are coded and modulated by TX data processor 1074 using the assigned carriers and further processed by a transmitter unit 1076 to generate an uplink modulated signal that is then transmitted from antenna 1052.

At access point 1002, the transmitted and modulated signals from the terminals are received by antenna 1018, processed by a receiver unit 1032, and demodulated and decoded by an RX data processor 1034. The decoded signals can be provided to a data sink 1036. Receiver unit 1032 may estimate the received signal quality (e.g., the received signal-to-noise (SNR)) for each terminal and provide this information to controller 1020. Controller 1020 may then derive the power control information for each terminal such that the received signal quality for the terminal is maintained within an acceptable range. RX data processor 1034 provides the recovered feedback information (e.g., the required transmit power) for each terminal to controller 1020 and scheduler 1030.

Scheduler 1030 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 1020 and 1060, TX and RS processors 1014 and 1034, and so on) for these techniques may be implemented within one or more application specific integrated circuits (ASICs), digital signal processors (DSPs), digital signal processing devices (DSPDs), programmable logic devices (PLDs), field programmable gate arrays (FPGAs) processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 11:
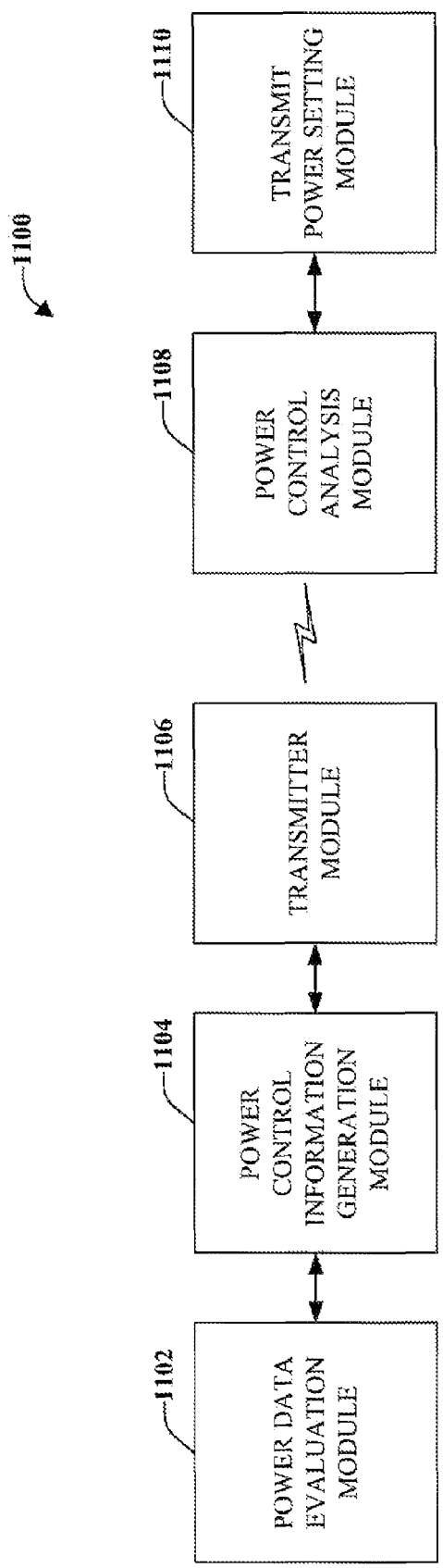
FIG. 11 is an illustration of a system that facilitates control of transmission power in accordance with one or more aspects presented herein.

Referring now to FIG. 11, a system 1100 for facilitating serving sector directed power control is illustrated. System 1100 can include a power data evaluation module 1102 that can analyze conditions and power related information associated with a terminal or set of terminals to determine if the serving sector is to direct transmit power. A power control information generation module 1104 can generate power control information that can be used to direct transmit power of a terminal supported by the serving sector based upon the evaluation of power related information. Power control information can be included within an assignment block or broadcast to multiple terminals. A transmitter module 1106 can send or transmit power control information to a terminal.

System 1100 can also include a power control analysis module 1108 associated with a terminal. Power control analysis module 1108 can analyze the power control information provided by a serving sector and any additional relevant data (e.g., interference information and/or terminal power constraints. In particular, the power control information can include a specific power level or range of power levels. The power control information can include a default value that allows the terminal to utilize normal power control procedures to determine transmit power. A transmit power setting module 1110 can set transmit power for the terminal in accordance with the power control analysis.

What has been described above includes examples of one or more aspects. It is, of course, not possible to describe every conceivable combination of components of ordinary skill in the art may recognize that many further combinations and permutations of various aspects are possible. Accordingly the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" or "comprising" is interpreted when employed as a transitional word in a claim.

What is claimed is:

1. A method for facilitating serving sector control of terminal transmission power comprising:
    analyzing power related data associated with a terminal supported by a serving sector;
    obtaining non-serving sector interference information through backhaul signaling; and
    transmitting power control information, based at least in part upon the analysis, to the terminal supported by the serving sector, wherein transmission power of the terminal is a function of the power control information, the power control information is a function of the non-serving sector interference information, and the power control information can override terminal-based transmission power computation.

2. The method of claim 1, wherein the power control information is transmitted to the terminal in a block resource assignment book.

3. The method of claim 1, wherein the power control information defines a minimum transmission power level.

4. The method of claim 1, further comprising determining when the serving sector is to direct transfer power for the terminal.

5. The method of claim 4, wherein the power control information is capable of indicating that the terminal is to determine transmit power independent of the serving sector.

6. The method of claim 1, wherein the power control information is a function of quality of service requirement.

7. The method of claim 1, wherein the power control information is a function of the received signal quality from the terminal.

8. The method of claim 1, wherein the power control information specifies the period for which the transmit power is directed by the serving sector.

9. A method of controlling terminal transmit power in a wireless environment, comprising:
    receiving power control information from a serving sector of a terminal; and
    determining transmit power for the terminal based at least in part upon the power control information, the power control information being a function of non-serving sector interference information that is obtained through backhaul signaling, wherein the power control information can override terminal-based transmit power computation.

10. The method of claim 9, further comprising analyzing the power control information to determine a power parameter, the power parameter describes a limit for the transmit power.

11. The method of claim 9, further comprising:
  determining when the power control information specifies independent determination of the transmit power; and
  computing transmit power as a function of the non-serving sector interference information.

12. The method of claim 9, further comprising adjusting the transmit power as a function of the non-serving sector interference information.

13. The method of claim 9, the power control information includes a duration parameter that specifies a duration for the power control information.

14. The method of claim 9, the power control information is contained in a resource assignment block for the terminal.

15. An apparatus the facilitates controlling transmit power of terminals supported by an access point, comprising:
  a processor that executes instructions for sending a power control direction to a terminal supported by an access point, transmit power of the terminal is controlled based at least in part upon the power control direction, the power control direction being a function of non-serving sector interference information, wherein the power control direction can supersede terminal-based transmit power computation; and
  a memory that obtains the non-serving sector interference information through backhaul signaling and stores power related information including the non-serving sector interference information, the power control direction is based least in part upon the power related information.

16. The apparatus of claim 15, wherein the power control device is included within a resource assignment message.

17. The apparatus of claim 15, wherein the processor further executes instructions for determining when to override an independent terminal power procedure for the terminal.

18. The apparatus of claim 15, wherein the processor further executes instructions for evaluating at least one of a quality of service requirement, signal to noise ratio performance or interference information in determining the power control direction.

19. The apparatus of claim 15, wherein the power control direction specifies a transmit power limit for the terminal.

20. The apparatus of claim 15, wherein the power control direction a duration parameter than specifies a duration of control by the access point.

21. An apparatus that facilitates controlling of terminal transmit power, comprising:
  a memory that stores information associated with transmit power of a terminal; and
  a processor that executes instructions for determining the transmit power based at least in part upon power control information received from an access point that supports the terminal, the power control information being a function of non-serving access point interference information that is obtained through backhaul signaling, wherein power control information can override terminal-based transmit power computation.

22. The apparatus of claim 21, wherein the processor further executes instructions for adjusting the transmit power as a function of the non-serving access point interference information.

23. The apparatus of claim 21, wherein the processor further executes instructions for determining when power control information is to override independent transmit power computation.

24. The apparatus of claim 21, wherein the power control information includes a duration parameter that specifies a duration for the power control information.

25. An apparatus that facilitates control of transmit power, comprising:
  means for obtaining non-serving sector interference information through backhaul signaling;
  means for evaluating power related data for a serving sector;
  means for generating power control information for a terminal based at least in part upon the evaluation and the non-serving sector interference information; and
  means for providing the power control information to the terminal, the power control information directs transmit power for the terminal, wherein the power control information can override terminal-based transmit power calculation.

26. The apparatus of claim 25,
  wherein the power related data includes the non-serving sector interference information.

27. The apparatus of claim 25, wherein the power control information specifies the period for which the transmit power is directed by the serving sector.

28. The apparatus of claim 25, wherein the power related data includes at least one of a quality of service requirement, signal to noise ratio performance or interference information.

29. An apparatus that facilitates determining transmit power for a terminal, comprising:
  means for obtaining power control information from a serving sector supporting a terminal; and
  means for setting transmit power level of the terminal as a function of the power control information, wherein the power control information is based on non-serving sector interference information that is obtained through backhaul signaling, and can override terminal-based transmit power level calculation.

30. The apparatus of claim 29, further comprising means for analyzing the power control information to determine a minimum transmit power level.

31. The apparatus of claim 29, further comprising means for adjusting the transmit power level as a function of the non-serving sector interference information.

32. The apparatus of claim 29, further comprising:
  means for determining when the power control information specifies independent determination of the transmit power level; and
  means for setting the transmit power level as a function of the non-serving sector interference information.

33. A non-transitory computer-readable medium having instructions for:
  obtaining non-serving sector interference information through backhaul signaling;
  generating power control information as a function of data associated with a terminal supported by an access point; and
  transmitting the power control information to the terminal, the power control information directs transmit power for the terminal, wherein the power control information is based on the non-serving sector interference information, and can override terminal-based transmit power computation.

34. The non-transitory computer-readable medium of claim 33, the instructions further comprising identifying conditions that warrant override of independent power computation by the terminal.

35. The non-transitory computer-readable medium of claim 33, wherein the power control information is included in a message that assigns resources to the terminal.

36. A non-transitory computer-readable medium having instructions for:

obtaining a power instruction from an access point supporting a terminal; and controlling transmit power for the terminal based at least in part upon the power control instruction, wherein the power instruction is based on non-serving sector interference information that is obtained through backhaul signaling, and can override terminal-based transmit power calculation.

37. The non-transitory computer-readable medium of claim 36, further comprising adjusting the transmit power as a function of the non-serving sector interference information.

38. The non-transitory computer-readable medium of claim 36, the instructions further comprising determining that the power control instruction specifies independent computation of the transmit power for the terminal.

39. The non-transitory computer-readable medium of claim 36, wherein the power control instruction includes a duration parameter that specifies duration of the power control instruction.

40. A processor that executes computer-executable instructions that facilitate serving sector control of transmit power, the instructions comprising:

obtaining non-serving sector interference information through backhaul signaling;

evaluating data related to a terminal supported by a serving sector;

provisioning the terminal with power control information that is based on the non-serving sector interference information and overrides terminal power estimation of transmit power for the terminal.

41. The processor of claim 40, wherein the power control information includes limit for one transmit power.

42. The processor of claim 40, wherein the power control information is provisioned in a message assigning at least one resource to the terminal.

43. The processor of claim 40, the instructions further comprising broadcasting the power control information to a plurality of terminals.

44. A processor that executes computer-executable instructions that facilitate control of transmit power, the instructions comprising:

receiving power control information for a terminal from a serving sector that supports the terminal; and computing transmit power based at least in part upon the received power control information, wherein the power control information is based on non-serving sector interference information that is obtained through backhaul signaling and overrides the terminal-based transmit power computation.

45. The processor of claim 44, the instructions further comprising analyzing the power control information to identify a limit for the transmit power.

46. The process of claim 44, the instructions further comprising analyzing the power control information to determine when the independent determination of transmit power is specified.

* * * * *